(12) United States Patent
Wingett et al.

(10) Patent No.: US 7,610,828 B2
(45) Date of Patent: Nov. 3, 2009

(54) FLIGHT CONTROL SURFACE ACTUATOR ASSEMBLY INCLUDING A FREE TRIAL MECHANISM

(75) Inventors: Paul T. Wingett, Mesa, AZ (US); Casey Hanlon, Queen Creek, AZ (US); Calvin C. Potter, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 448 days.

(21) Appl. No.: 11/331,755

(22) Filed: Jan. 13, 2006

(65) Prior Publication Data

US 2007/0108343 A1    May 17, 2007

Related U.S. Application Data

(60) Provisional application No. 60/737,245, filed on Nov. 15, 2005.

(51) Int. Cl.
*F16H 1/24*    (2006.01)
(52) U.S. Cl. .................. 74/424.78; 192/56.5; 244/99.2; 244/99.3
(58) Field of Classification Search .............. 244/99.2, 244/99.3; 74/89.26, 89.38, 89.39, 424.71, 74/424.78, 405, 406; 192/56.5, 71
See application file for complete search history.

(56) References Cited

U.S. PATENT DOCUMENTS

| | | | |
|---|---|---|---|
| 2,465,309 A | | 3/1949 | Happe et al. |
| 2,475,518 A | * | 7/1949 | Ristow ..................... 192/56.53 |
| 2,501,648 A | | 3/1950 | Ogden |
| 2,602,664 A | | 7/1952 | Metchett |
| 2,701,478 A | * | 2/1955 | Riess ......................... 74/89.38 |
| 3,454,144 A | | 7/1969 | Haller |
| 4,179,944 A | | 12/1979 | Conner |
| 4,431,093 A | * | 2/1984 | Yang ........................... 188/378 |
| 4,637,272 A | * | 1/1987 | Teske et al. ................ 74/89.26 |

(Continued)

FOREIGN PATENT DOCUMENTS

EP     1524188 A2     4/2005

(Continued)

OTHER PUBLICATIONS

European Search Report, EP06123914.1, dated Feb. 22, 2008.

*Primary Examiner*—Michael R Mansen
*Assistant Examiner*—Philip J Bonzell
(74) *Attorney, Agent, or Firm*—Ingrassia Fisher & Lorenz, P.C.

(57) ABSTRACT

A flight control surface actuator includes a mechanism that enables the actuator translation member to be selectively decoupled from the actuator rotating member. The actuator includes an actuation member, a translation member, an extension member, and a locking member. The actuation member is adapted to receive a drive force and is configured, in response to the drive force, to rotate and cause the translation member to translate. The extension member surrounds at least a portion of the translation member and is configured to be selectively coupled to, and decoupled from, the translation member. The locking member surrounds at least a portion of the extension tube and is movable between a lock position, in which the locking member couples the extension member to the translation member, and a release position, in which the locking member decouples the extension member from the translation member.

15 Claims, 3 Drawing Sheets

U.S. PATENT DOCUMENTS

| | | | |
|---|---|---|---|
| 4,864,882 A | 9/1989 | Capewell | |
| 4,876,906 A | 10/1989 | Jones | |
| 5,092,539 A | 3/1992 | Caero | |
| 5,144,851 A * | 9/1992 | Grimm et al. | 74/89.26 |
| 5,360,185 A * | 11/1994 | Derrien | 244/102 R |
| 5,370,011 A * | 12/1994 | Gilges et al. | 74/89 |
| 5,398,780 A * | 3/1995 | Althof et al. | 185/39 |
| 5,409,185 A * | 4/1995 | Oldakowski | 244/75.1 |
| 5,582,390 A * | 12/1996 | Russ | 244/99.2 |
| 5,655,636 A * | 8/1997 | Lang et al. | 192/223 |
| 5,916,325 A | 6/1999 | Madrid et al. | |
| 5,950,774 A | 9/1999 | Lang et al. | |
| 5,957,798 A | 9/1999 | Smith, III et al. | |
| 6,794,779 B2 | 9/2004 | Ma et al. | |
| 6,851,648 B2 * | 2/2005 | Perni et al. | 244/99.3 |
| 6,928,895 B2 * | 8/2005 | Davies et al. | 74/89.26 |
| 2005/0103137 A1 * | 5/2005 | Chang et al. | 74/89.26 |
| 2005/0103139 A1 * | 5/2005 | Vissers et al. | 74/89.39 |
| 2005/0103928 A1 | 5/2005 | Flatt | |

FOREIGN PATENT DOCUMENTS

| | | |
|---|---|---|
| GB | 732465 | 6/1955 |
| WO | 0063590 | 10/2000 |
| WO | WO 2005/050062 A1 | 6/2005 |

* cited by examiner

FLIGHT CONTROL SURFACE ACTUATOR ASSEMBLY INCLUDING A FREE TRIAL MECHANISM

CROSS-REFERENCES TO RELATED APPLICATIONS

This application claims the benefit of U.S. Provisional Application No. 60/737,245, filed Nov. 15, 2005.

TECHNICAL FIELD

The present invention relates to actuators and, more particularly, to a flight control surface actuator that includes a mechanism that enables the actuator translation member to be selectively decoupled from the actuator rotating member.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and thrust reverser actuation control systems, the actuators that are used may be subject to relatively severe environmental conditions, as well as relatively high magnitude shock and vibration.

As a result of, for example, the environmental conditions, and relatively high magnitude shock and vibration an actuator experiences, the actuators could become jammed or otherwise inoperable. For example, the actuator gear train could potentially jam or, if the actuator is a ballscrew-type actuator, the ball returns could become jammed. Under such conditions the actuator may "lock up" or otherwise become inoperable. Though such situations are unlikely, analysis has shown that secondary damage to other portions of the actuator, or to various portions of the system in which the actuator is installed, may result under certain postulated circumstances. For example, if an actuator becomes jammed, it is postulated that all of the drive force supplied from the drive force source could be concentrated on the jammed actuator. This postulated condition may result in damage to the actuator or the system in which it is installed. Repairing such damage can be costly and result in system down time. One solution is to use stronger components, but this increases the cost and/or weight of the system. Another solution is to include numerous, independently operated torque limiters or decoupler assemblies. However, this solution may also increase system cost and/or weight.

Accordingly, there is a need for an actuator that improves upon one or more of the drawbacks identified above. Namely, an actuator that reduces the likelihood of component damage if the actuator becomes inoperable by, for example, becoming jammed, without significantly increasing the cost and/or the weight of system components. The present invention addresses one or more of these needs.

BRIEF SUMMARY

The present invention provides a flight control surface actuator assembly that is configured to selectively disconnect the translation member from the extension tube. In one embodiment, and by way of example only, an actuator assembly includes an actuation member, a translation member, an extension member, and a locking member. The actuation member is adapted to receive a drive force and is configured, upon receipt thereof, to rotate. The translation member is disposed adjacent the actuation member and is configured, upon rotation of the actuation member, to translate. The extension member is configured to couple to a flight control surface, surrounds at least a portion of the translation member, and is configured to be selectively coupled to, and decoupled from, the translation member. The locking member surrounds at least a portion of the extension tube and is movable between a lock position, in which the locking member couples the extension member to the translation member, and a release position, in which the locking member decouples the extension member from the translation member.

In another exemplary embodiment, a flight control surface actuation system includes an actuator controller and a plurality of flight control surface actuators. The actuator controller is configured to receive flight control surface position commands and is operable, in response thereto, to supply actuator position commands signals. The flight control surface actuators are each coupled to selectively receive the actuator position commands and are each operable, upon receipt thereof, to move to a commanded position. One or more of the flight control surface actuators include a motor, an actuation member, a translation member, an extension member, and a locking member. The motor is adapted to receive drive power and is configured, upon receipt thereof, to supply a drive force. The actuation member is coupled to receive the drive force from the motor and is configured, upon receipt thereof, to rotate. The translation member is disposed adjacent the actuation member and is configured, upon rotation of the actuation member, to translate. The extension member is configured to couple to a flight control surface, surrounds at least a portion of the translation member, and is configured to be selectively coupled to, and decoupled from, the translation member. The locking member surrounds at least a portion of the extension tube and is movable between a lock position, in which the locking member couples the extension member to the translation member, and a release position, in which the locking member decouples the extension member from the translation member.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
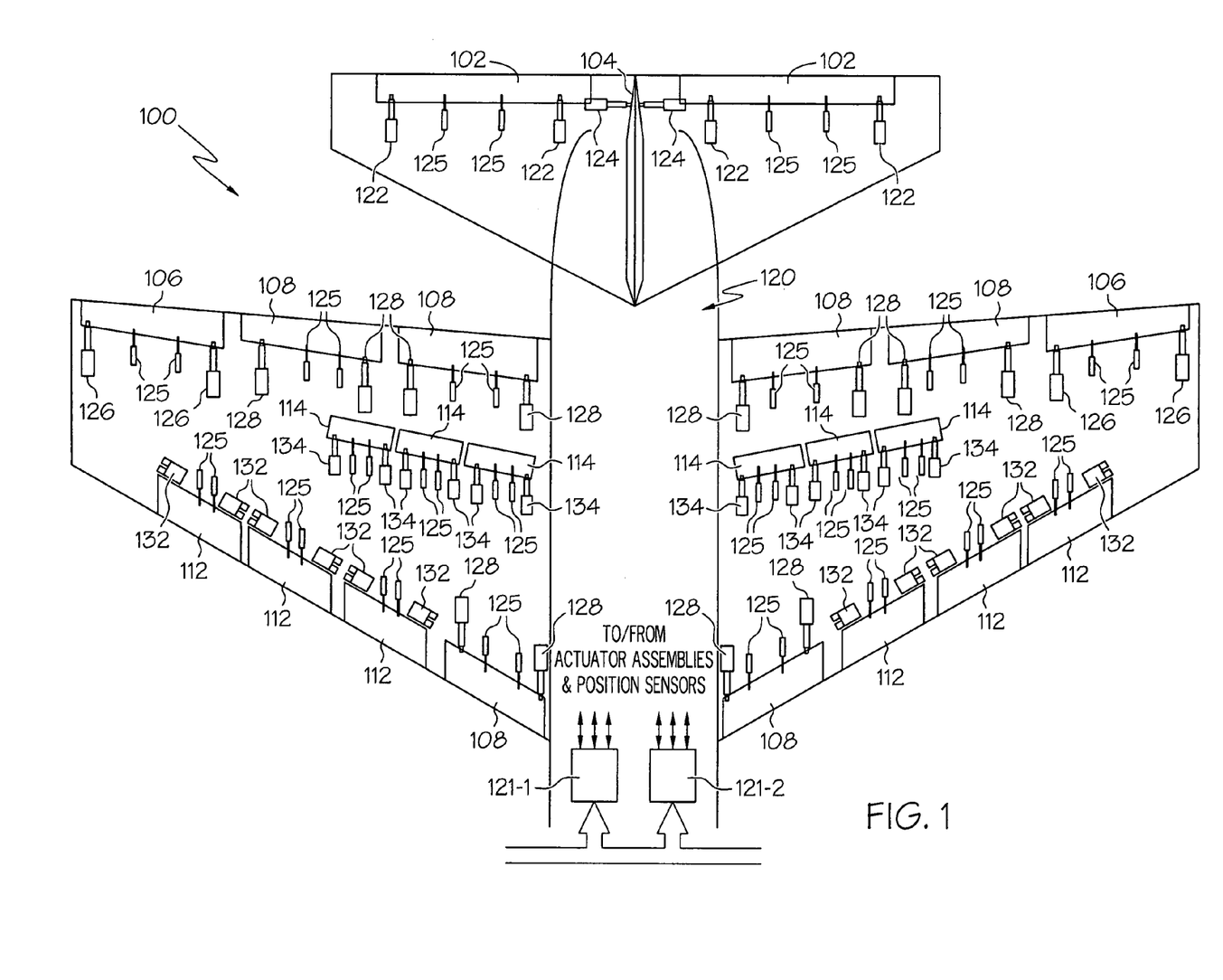
FIG. 1 is a functional block diagram of an exemplary actuation control system according to an embodiment of the present invention.

Turning first to FIG. 1, a schematic diagram of a portion of an exemplary aircraft and a portion of an exemplary flight control surface actuation system is shown. In the illustrated embodiment, the aircraft 100 includes a pair of elevators 102, a rudder 104, and a pair of ailerons 106, which are the primary flight control surfaces, and a plurality of flaps 108, slats 112, and spoilers 114, which are the secondary flight control surfaces. The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved either by banking the aircraft or by varying the thrust levels from the engines on opposing sides of the aircraft 100. It will additionally be appreciated that the aircraft 100 could include horizontal stabilizers (not shown).

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

The flight control surfaces 102-114 are moved between retracted and extended positions via a flight control surface actuation system 120. The flight control surface actuation system 120 includes one or more actuator controllers 121, a plurality of primary flight control surface actuators, which include elevator actuators 122, rudder actuators 124, and aileron actuators 126, and a plurality of secondary control surface actuators, which include flap actuators 128, slat actuators 132, and spoiler actuators 134. It will be appreciated that the number of actuator controllers 121 may vary. However, in the depicted embodiment, the flight control surface actuation system 120 includes two multi-channel actuator controllers 121 (121-1, 121-2).

The flight control surface actuation system 120 may be implemented using various numbers and types of flight control surface actuators 122-134. In addition, the number and type of flight control surface actuators 122-134 per flight control surface 102-114 may be varied. In the depicted embodiment, however, the system 120 is implemented such that two primary flight control surface actuators 122-126 are coupled to each primary flight control surface 102-16, and two secondary control surface actuators 128-134 are coupled to each secondary control surface 108-114. Moreover, each of the primary surface actuators 122-126 and each of the flap actuators 128 are preferably a linear-type actuator, such as, for example, a ballscrew actuator, and each of the slat actuators 132 and each of the spoiler actuators 134 are preferably a rotary-type actuator. It will be appreciated that this number and type of flight control surface actuators 122-134 are merely exemplary of a particular embodiment, and that other numbers and types of actuators 122-134 could also be used. Moreover, some or all of the secondary flight control surface actuators could be interconnected via drive mechanisms, such as flexshafts, and driven via one or more central drive units, as is generally known.

The flight control surface actuation system 120 additionally includes a plurality of control surface position sensors 125. The control surface position sensors 125 sense the positions of the flight control surfaces 102-114 and supply control surface position feedback signals representative thereof. It will be appreciated that the control surface position sensors 125 may be implemented using any one of numerous types of sensors including, for example, linear variable differential transformers (LVDTs), rotary variable differential transformers (RVDTs), Hall effect sensors, resolvers, or potentiometers, just to name a few. In the depicted embodiment, a pair of control surface position sensors 125 is coupled to each of the flight control surfaces 102-114. It will be appreciated, however, that this is merely exemplary of a particular embodiment and that more or less than two position sensors 125 could be coupled to each flight control surface 102-114. Moreover, in other embodiments, the flight control surface actuation system 120 could be implemented without some, or all, of the control surface position sensors 125.

The flight control surface actuators 122-134 are each driven by one or more non-illustrated motors. Although the motors may be either electric, pneumatic, or hydraulic motors, in a particular preferred embodiment the motors are electric motors. Moreover, although various numbers of motors could be associated with each actuator, preferably two motors are associated with each flight control surface actuator 122-134 such that either, or both, actuator motors can drive the associated actuator 122-134. The actuator motors are selectively energized and, upon being energized, rotate in one direction or another, to thereby supply a drive force to the associated actuator 122-134. The actuators 122-134 are each coupled to receive the drive force supplied from its associated actuator motors and, depending on the direction in which the actuator motors rotate, move between stowed and deployed positions, to thereby move the primary and secondary flight control surfaces 102-114. It will be appreciated that the actuator motors may be implemented as any one of numerous types of AC or DC motors, but in a preferred embodiment the actuator motors are preferably implemented as brushless DC motors.

The system 120 and actuator controllers 121-1, 121-2 may be implemented according to any one of numerous operational configurations. For example, the system 120 could be configured such that one of the controllers 121-1 (121-2) is an active controller, while the other controller 121-2 (121-1) is in an inactive (or standby) mode. Alternatively, the system 120 could be configured such that both controllers 121-1, 121-2 are active and controlling all, or selected ones, of the flight control surface actuator assemblies 122-134. No matter the specific configuration, each controller 121-1, 121-2, when active, receives flight control surface position commands from one or more non-illustrated external systems, such as a flight control computer or pilot controls. In response to the flight control surface position commands, the active controllers 121-1, 121-2 supply actuator position command signals to the appropriate flight control surface actuator assemblies 122-134. The flight control surface actuator assemblies 122-134, in response to the position command signals, move the appropriate flight control surfaces 102-114 to the commanded flight control surface position.

The controllers 121-1, 121-2 also receive monitor signals that are representative of flight control surface actuator assembly 122-134 operability. The controllers 121-1, 121-2, based on these monitor signals, determine the operability of the flight control surface actuator assemblies 122-134. If one or both controllers 121-1, 121-2 determines that a flight control surface actuator assembly 122-134 is inoperable, it supplies a signal to the actuator assembly 122-134 to prevent further inoperability or damage. It will be appreciated that the monitor signals that the controllers 121-1, 121-2 receive may be supplied directly from the flight control surface actuator assemblies 108-114. In a particular preferred embodiment, however, the monitor signals are supplied from the associated flight control surface position sensors 125. A more detailed description of the actuator assemblies 122-134, and how each is configured to respond to the signals from the actuator controllers 121 to prevent further damage will now be described.

With reference now to FIGS. 2-5, it is seen that the depicted actuator 200 is a linear actuator that includes an actuation member 202, a translation member 204, an extension member 206, and a locking member 208. The actuation member 202 is preferably implemented as a ballscrew, and is rotationally mounted within an actuator housing assembly 212 (shown in phantom in FIG. 2). The actuation member 202 includes a first end 214, a second end 216, an inner surface 218, and an outer surface 222. The ballscrew inner surface 218 defines a substantially cylindrical passageway 224 that extends at least partially through the ballscrew 202. The ballscrew outer surface 222 has a plurality of ball grooves (or "threads") 226 formed thereon and has a plurality of stops 228-1, 228-2 formed thereon. The ballscrew 202 receives a rotational drive force from, for example, a motor 210, and or a motor/geartrain combination (not illustrated), which causes the ballscrew 202 to rotate.

The translation member 204 is preferably implemented as a ballnut, and is disposed at least partially around the ballscrew 202. The ballnut 204, similar to the ballscrew 202, includes a first end 234, a second end 236, an inner surface 238, and an outer surface 242. The ballnut 204 is mounted against rotation within the actuator housing assembly 212 and is configured, in response to rotation of the ballscrew 202, to translate axially. The ballnut 204, similar to the ballscrew 202, has a plurality of helical ball grooves (or "threads") 244 formed therein. A plurality of recirculating balls 246 are disposed within the ballnut ball grooves 244, in selected ones of the ballscrew ball grooves 226, and in non-illustrated ball returns formed in the ballnut 204. The balls 246, in combination with the ball grooves 226, 244, convert the rotational movement of the ballscrew 202 into the translational movement of the ballnut 204. It will be appreciated that the direction in which the ballnut 204 travels will depend on the direction in which the ballscrew 202 rotates.

The extension member 206 includes a first end 254, a second end 256, an inner surface 258, and an outer surface 262. The extension member 206 is preferably (though not necessarily) configured as a tube, and is thus referred to hereinafter as the extension tube. A rod end assembly 264 is coupled to the extension tube second end 256 and includes a spherical bearing. The rod end assembly 264 is configured to couple the extension tube 206 to a component (not shown in FIG. 2), such as one of the above-described aircraft flight control surfaces 102-114, so that the actuator 202 can move the component to the position commanded by one of the actuator controllers 121. The extension tube 206 is selectively coupled to, and decoupled from, the ballnut 204 via a plurality of lock pins 282.

The lock pins 282 are disposed within lock pin openings 284 that extend between the extension tube inner 258 and outer 262 surfaces near the extension tube first end 254. The lock pins 282 are movable between an engage position and a disengage position. In the engage position the lock pins 282 are disposed in collocated lock pin openings 404 (se FIG. 4) formed in the ballnut outer surface 242 to thereby couple the extension tube 206 to the ballnut 204. In the disengage position the lock pins 282 are not disposed in the ballnut lock pin openings 404 to thereby decouple the extension tube 206 from the ballnut 204. The lock pins 282 are biased radially outwardly away from the ballnut 204, toward the disengage position, via a lock pin bias spring 402 (see FIG. 4), and are moved to and held in the engage position by the locking member 208.

The locking member 208 surrounds the extension tube 206. The locking member 208 is also preferably (though not necessarily) configured as a tube, and as such will be referred to hereinafter as the locking tube 208. The locking tube 208 includes an inner surface 292 that has a plurality of lock lands 502 and a plurality of pin release valleys 504 (see FIG. 5) formed thereon. The locking tube 208 is movable between a lock position and a release position. In the lock position, the lock lands 502 on the locking tube inner surface 292 move the lock pins 282 to the engage position, within the ballnut lock pin openings 404. In the release position, the pin release valleys 504 are aligned with the lock pins 282, allowing the lock pin bias springs 402 to move the lock pins 282 to the disengage position, out of the ballnut lock pin openings 404.

Figure 2:
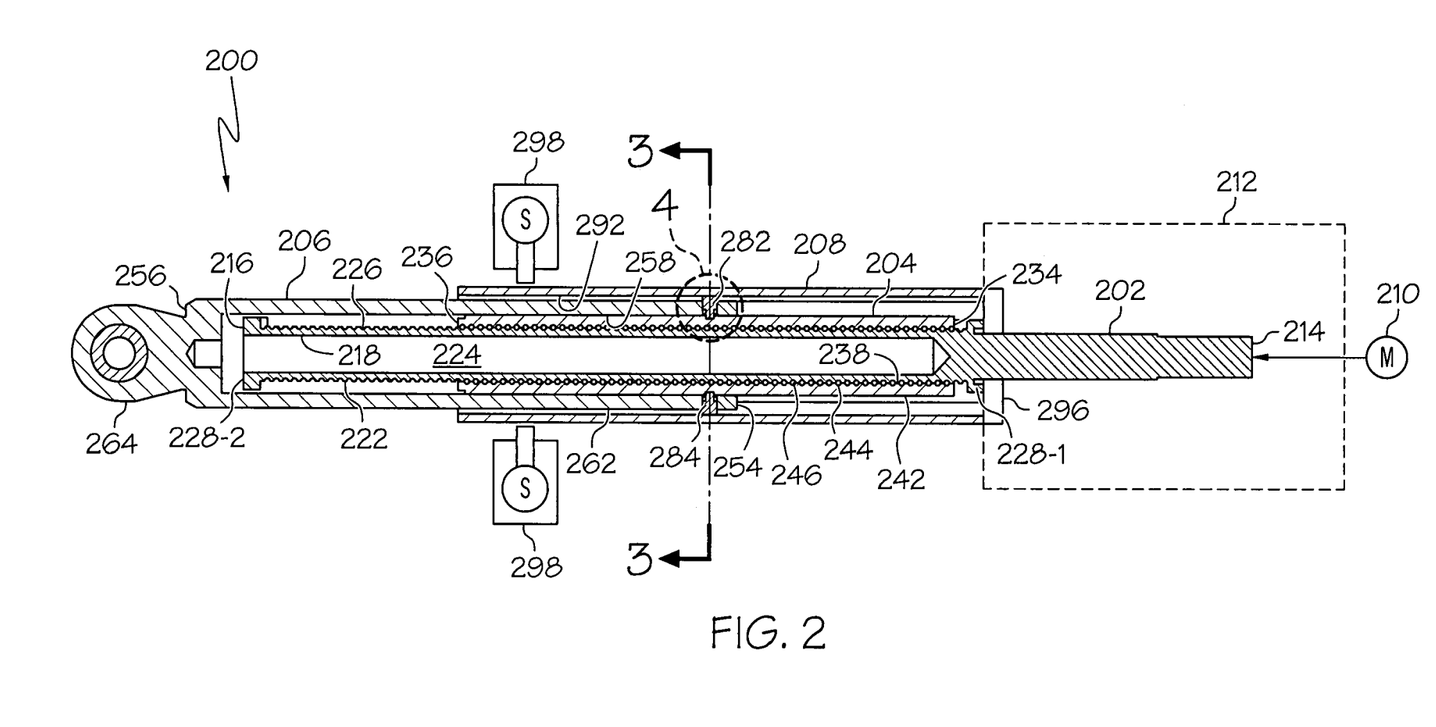
FIG. 2 is a partial cross section view of an exemplary actuator according to an embodiment of the present invention, and that may be used in the system of FIG. 1.
Figure 3:
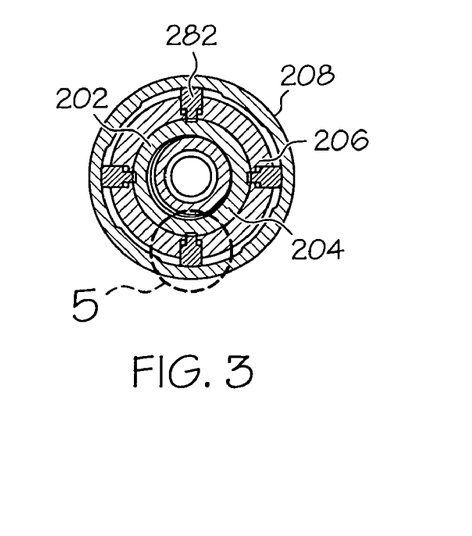
FIG. 3 is a cross section view of the actuator taken along line 3-3 of FIG. 2.
Figure 4:
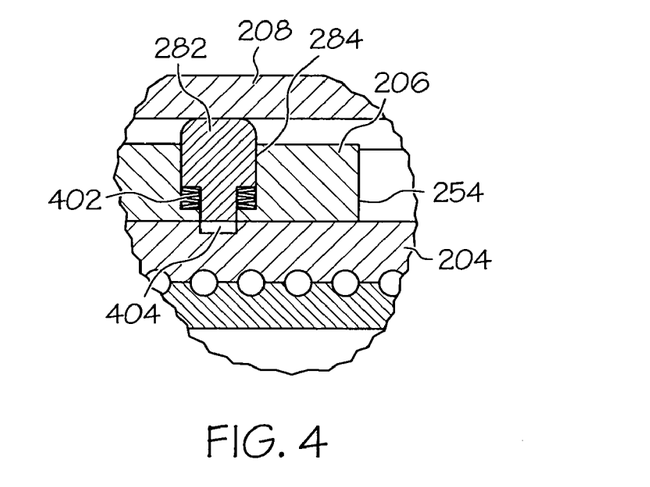
FIG. 4 is a close-up section view of the detail labeled 4-4 in FIG. 2.
Figure 5:
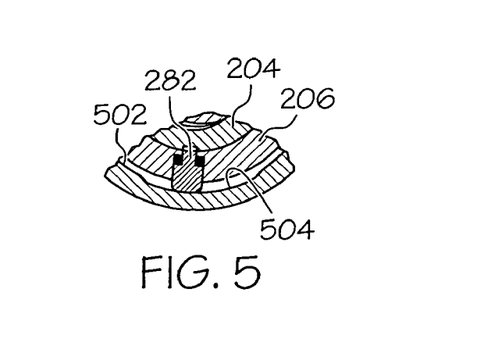
FIG. 5 is a close-up section view of the detail labeled 5-5 in FIG. 3.

The locking tube 208 is biased toward the release position by, for example, a torsion spring 296. As FIG. 2 shows, one or more locking tube actuators 298, which are preferably dual-coil type solenoids, are disposed adjacent the locking tube 208. The locking tube actuators 298 are normally de-energized to hold the locking tube 208 in the lock position. During normal system operations, the actuator controllers 121 keep the solenoids 298 de-energized. If, however, the actuator controllers 121 determine that the actuator 200 is jammed or otherwise inoperable, the actuator controllers 121 energize the solenoids 298 causing the solenoids 298 to move to the disengage positions. As a result, the torsion spring 296 moves the locking tube 208 to its release position, causing the lock pins 282 to move to the disengage position, out of the ballnut lock pin openings 404, to thereby disconnect the ballnut 204 from the extension tube 206. The locking tube 208 is configured to be manually reset to the lock position, but could alternatively be configured to be reset automatically.

The actuator 200 described herein is configured such that the ballnut 204 can be selectively decoupled from the extension tube 206. Thus, in the unlikely event the actuator 200 becomes jammed, the ballnut 204 can be automatically decoupled from the extension tube 206 so that one or more remaining actuators 200 coupled to the same component can be used to move the component in an unimpeded fashion. For example, if one of the flight control surface actuators 122-134 were to become jammed, the remaining actuator 122-134 coupled to that flight control surface 102-114 could position the flight control surface 102-114 to the commanded position.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An actuator assembly, comprising:
   an actuation member adapted to receive a drive force and configured, upon receipt thereof, to rotate;

a translation member disposed adjacent the actuation member and configured, upon rotation of the actuation member, to translate;

two or more translation member lock pin openings extending at least partially through the translation member;

an extension member configured to couple to a flight control surface, the extension member surrounding at least a portion of the translation member and configured to be selectively coupled to, and decoupled from, the translation member;

two or more extension member lock pin openings extending through the extension member;

two or more lock pins, each lock pin disposed within one of the extension member lock pin openings and movable between an engage position, in which each lock pin is further disposed within one of the translation member openings, and a disengage position, in which each lock pin is not further disposed within one of the translation member openings;

two or more lock pin bias springs, each lock pin bias spring disposed within one of the extension member lock pin openings and configured to bias the lock pin toward the disengage position; and a locking member surrounding at least a portion of the extension member and rotatable between a lock position, in which the locking member moves the lock pins into the engage position, and a release position, in which the locking member allows the lock pin bias springs to move the lock pins into the disengage position.

2. The actuator assembly of claim 1, wherein:

each lock pin further includes a first end and a second end;

each lock pin first end extends from the extension member lock pin opening and engages the locking member; and each lock pin second end is disposed within one of the translation member lock pin openings when the lock pin is in the engage position and is removed from the translation member lock pin openings when the lock pin is in the disengage position.

3. The actuator assembly of claim 2, wherein:

the locking member comprises an inner surface having two or more lock lands and two or more release valleys formed therein;

when the locking member is in the lock position, the lock lands engage each of the lock pin first ends and move the lock pins into the engage position; and when the locking member is in the release position, the release valleys engage the lock pin first ends and allow the lock pin bias springs to move the lock pins to the disengage position.

4. The actuator assembly of claim 1, further comprising:

a torsion spring coupled to the locking member and configured to supply a bias torque that biases the locking member toward the release position; and one or more locking member actuators configured to selectively engage and disengage the locking member, each locking member actuator, when engaging the locking member, operable to hold the locking member in the lock position against the bias torque of the torsion spring.

5. The actuator assembly of claim 4, wherein each locking member actuator comprises a solenoid adapted to be selectively energized and deenergized to thereby selectively disengage and engage the locking member, respectively.

6. The actuator assembly of claim 1, wherein:

the actuation member comprises a ballscrew;

the translation member comprises a ballnut mounted against rotation on the ballscrew and configured, upon rotation of the ballscrew, to translate; and the extension member comprises an extension tube having a rod end coupled thereto that is configured to couple to the flight control surface.

7. The actuator assembly of claim 1, further comprising:

a motor coupled to the actuation member and adapted to receive drive power, the motor configured, upon receipt of the drive power, to supply the drive force to the actuation member.

8. An actuator assembly, comprising:

an electric motor adapted to receive electrical drive power and configured, upon receipt thereof, to supply a drive force;

a ballscrew coupled to receive the drive force from the motor and configured, upon receipt thereof, to rotate;

a ballnut disposed adjacent the ballscrew and configured, upon rotation of the ballscrew, to translate;

two or more ballnut lock pin openings extending at least partially through the ballnut;

an extension tube configured to couple to a flight control surface, the extension tube surrounding at least a portion of the ballnut and configured to be selectively coupled to, and decoupled from, the ballnut;

two or more extension tube lock pin openings extending through the extension tube;

two or more lock pins, each lock pin disposed within one of the extension tube lock pin openings and movable between an engaged position, in which each lock pin is further disposed within one of the ballnut openings, and a disengaged position, in which each lock pin is not farther disposed within one of the ballnut openings;

two or more lock pin bias springs, each lock pin bias spring disposed within one of the extension tube lock pin openings and configured to bias the lock pin toward the disengage position; and a locking tube surrounding at least a portion of the extension tube and rotatable between a lock position, in which the locking tube moves the lock pins into the engage position, and a release position, in which the locking tube allows the lock pin bias springs to move the lock pins into the disengage position.

9. The actuator assembly of claim 8, wherein:

each lock pin further includes a first end and a second end;

each lock pin first end extends from the extension tube lock pin opening and engages the locking tube; and each lock pin second end is disposed within one of the ballnut lock pin openings when the lock pin is in the engage position and is removed from the ballnut lock pin openings when the lock pin is in the disengage position.

10. The actuator assembly of claim 9, wherein:

the locking tube comprises an inner surface having two or more lock lands and two or more release valleys formed therein;

when the locking tube is in the lock position, the lock lands engage each of the lock pin first ends and move the lock pins into the engage position; and when the locking tube is in the release position, the release valleys engage the lock pin first ends and allow the lock pin bias springs to move the lock pins to the disengage position.

11. The actuator assembly of claim 8, further comprising:

a torsion spring coupled to the locking tube and configured to supply a bias torque that biases the locking tube toward the release position; and one or more locking tube actuators configured to selectively engage and disengage the locking tube, each locking tube actuator, when engaging the locking tube, operable to hold the locking tube in the lock position against the bias torque of the torsion spring, each locking tube actuator including a solenoid adapted to be selectively energized and deenergized to thereby selectively disengage and engage the locking tube, respectively.

12. An actuator assembly, comprising:

an actuation member adapted to receive a drive force and configured, upon receipt thereof, to rotate;

a translation member disposed adjacent the actuation member and configured, upon rotation of the actuation member, to translate;

an extension member configured to couple to a flight control surface, the extension member surrounding at least a portion of the translation member and configured to be selectively coupled to, and decoupled from, the translation member;

a locking member surrounding at least a portion of the extension member and rotatable between a lock position, in which the locking member couples the extension member to the translation member, and a release position, in which the locking member decouples the extension member from the translation member;

a torsion spring coupled to the locking member and configured to supply a bias torque that rotationally biases the locking member toward the release position; and one or more locking member actuators configured to selectively engage and disengage the locking member, each locking member actuator, when engaging the locking member, operable to hold the locking member in the lock position against the bias torque of the torsion spring.

13. The actuator assembly of claim 12, further comprising:

two or more translation member lock pin openings extending at least partially through the translation member; two or more extension member lock pin openings extending through the extension member;

two or more lock pins, each lock pin disposed within one of the extension member lock pin openings and having at least a first end and a second end, each lock pin first end extending from the extension member lock pin opening and engaging the locking member, each lock pin movable between an engage position, in which each lock pin second end is disposed within one of the translation member lock pin openings, and a disengage position, in which each lock pin second end is not disposed within one of the translation member openings; and two or more lock pin bias springs, each lock pin bias spring disposed within one of the extension member lock pin openings and configured to bias the lock pin toward the disengage position, wherein the lock pins are in the engage and disengage position when the locking member is in the lock and release position, respectively.

14. The actuator assembly of claim 13, wherein:

the locking member comprises an inner surface having two or more lock lands and two or more release valleys formed therein;

when the locking member is in the lock position, the lock lands engage each of the lock pin first ends and move the lock pins into the engage position; and when the locking member is in the release position, the release valleys engage the lock pin first ends and allow the lock pin bias springs to move the lock pins to the disengage position.

15. The actuator assembly of claim 12, wherein:

each locking member actuator comprises a solenoid adapted to be selectively energized and deenergized to thereby selectively disengage and engage the locking member, respectively.

\* \* \* \* \*

UNITED STATES PATENT AND TRADEMARK OFFICE
CERTIFICATE OF CORRECTION

PATENT NO. : 7,610,828 B2 Page 1 of 1
APPLICATION NO. : 11/331755
DATED : November 3, 2009
INVENTOR(S) : Wingett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twelfth Day of October, 2010

David J. Kappos
*Director of the United States Patent and Trademark Office*